A. H. FARGO.
APPARATUS FOR WELDING ELECTRIC CONDUCTORS.
APPLICATION FILED MAY 10, 1915.
1,184,937.
Patented May 30, 1916.
3 SHEETS—SHEET 1.
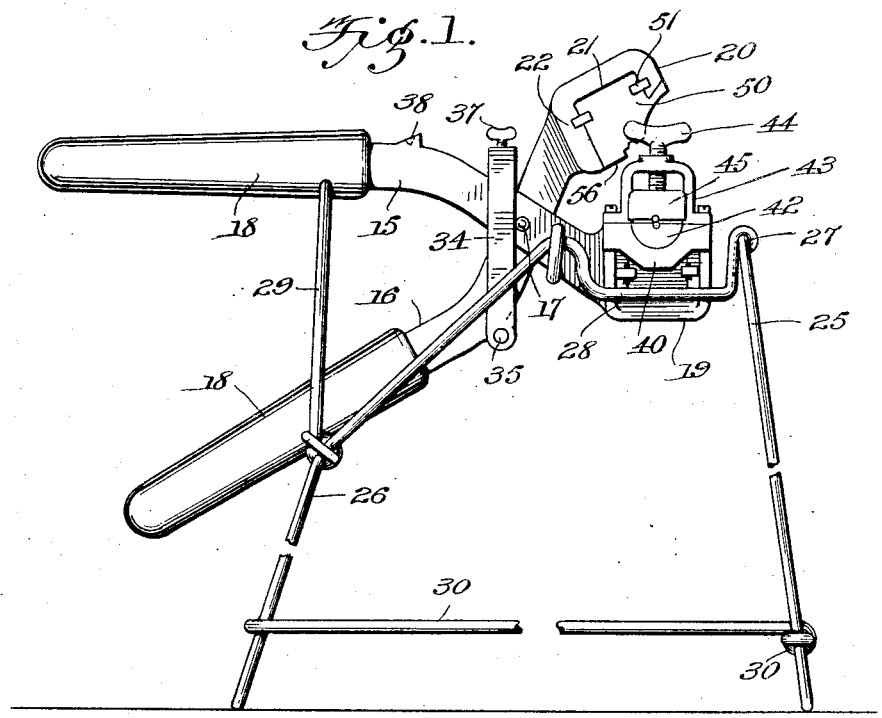
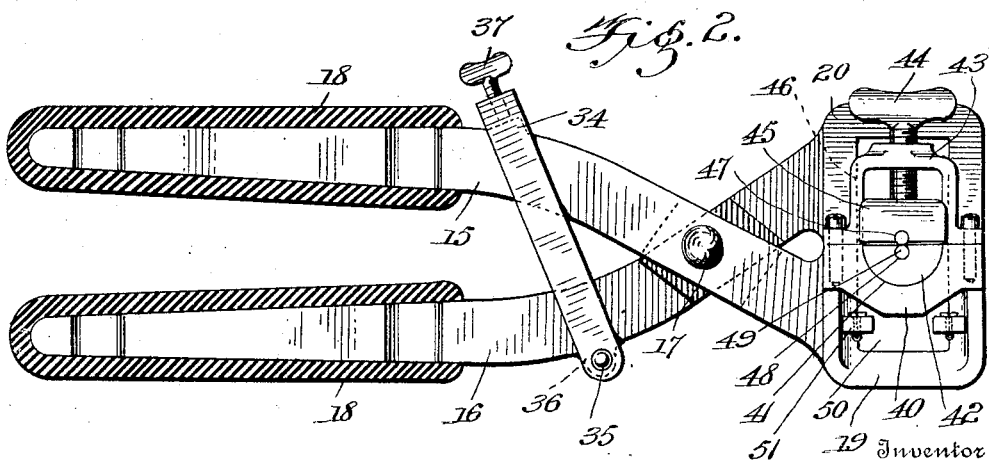

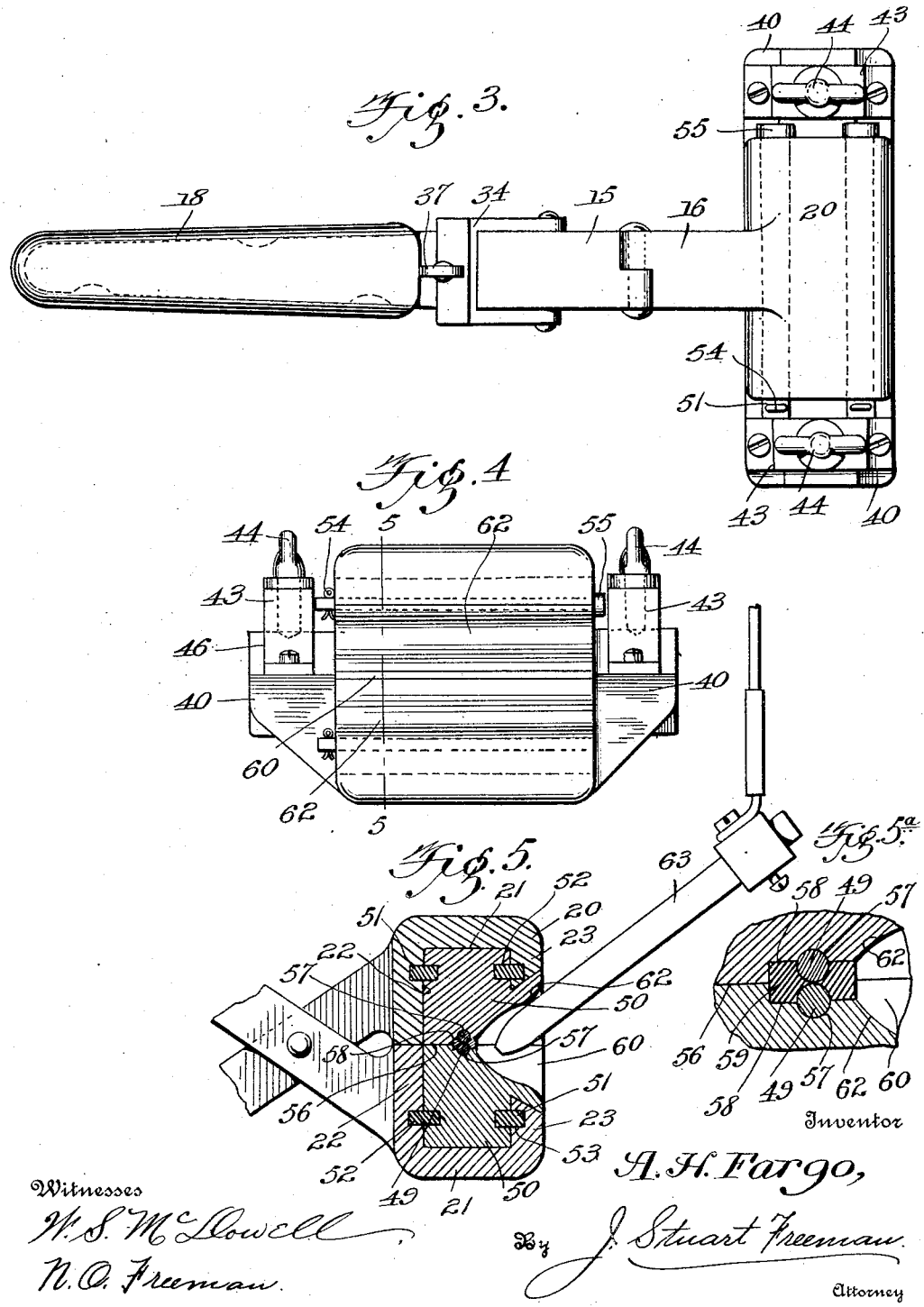

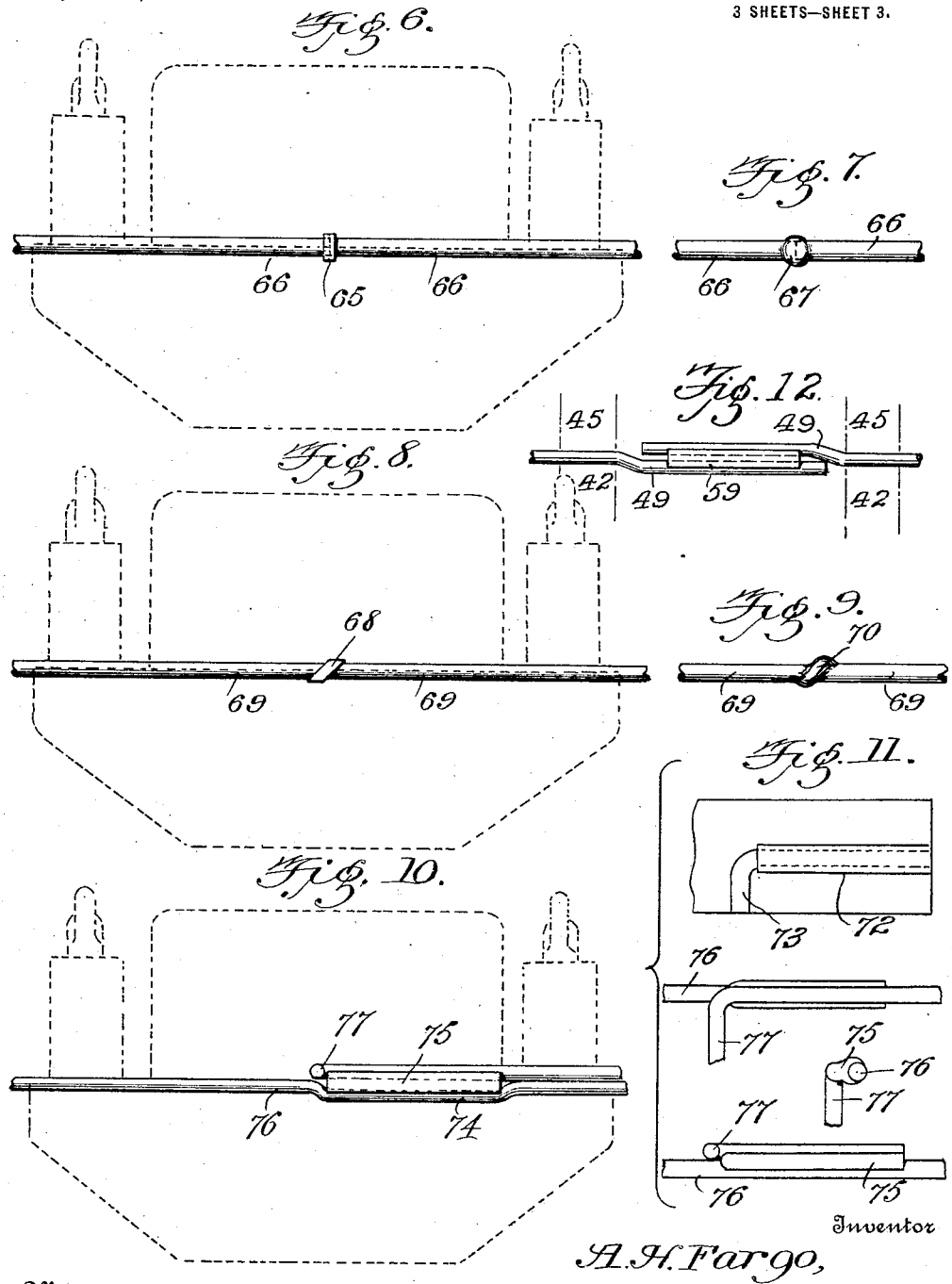

UNITED STATES PATENT OFFICE.

ARTHUR HOLLISTER FARGO, OF POUGHKEEPSIE, NEW YORK.

APPARATUS FOR WELDING ELECTRIC CONDUCTORS.

1,184,937. Specification of Letters Patent. Patented May 30, 1916.

Application filed May 10, 1915. Serial No. 26,933.

*To all whom it may concern:*

Be it known that I, ARTHUR H. FARGO, a citizen of the United States, and a resident of the city of Poughkeepsie, county of Dutchess, and State of New York, have invented certain new and useful Improvements in Apparatus for Welding Electric Conductors, and of which the following is an exact disclosure.

The object of the invention is to provide an improved apparatus for uniting by soldering, or welding, two or more electric conductors, wires, cables, etc., by eliminating the usual twisted joint particularly when the conductors are of such diameter, shape, or material, as to make close twisting of the same difficult or even impossible.

Another object is to provide a device for efficiently holding the conductors to be joined and to retain and mold the final shape of the joint while the same is cooling.

A further object is to provide a suitable, light, portable stand for holding the improved tool while the latter is being used.

A still further object is to provide in such a tool, interchangeable and replaceable molding blocks or bricks of suitable material of a relatively high fusing point, and when coöperating with each other, said blocks being open at a point intermediate the ends of a side parallel with their longitudinal axes.

Additional objects and advantages of the device are more fully brought out in the accompanying drawings in which—

Figure 1 is a side view of a tool and supporting stand comprising the preferred embodiment of the invention; Fig. 2 is an enlarged side elevation of the tool with the jaws thereof in closed position; Fig. 3 is a top plan view of the tool; Fig. 4 is a front, end view of the same; Fig. 5 is a section on the line 5—5 of Fig. 4, showing the use of an electrode in conjunction therewith; Fig. 5ª is an enlarged detailed view of a portion of Fig. 5; Fig. 6 is a diagrammatic view of the device holding two conductors arranged for a modified form of splice or weld; Fig. 7 shows the resultant joint; Fig. 8 shows the preparation for a second modified form of weld; Fig. 9 shows the resultant joint; Fig. 10 shows the preparation for making a T joint; Fig. 11 shows the top, front and end views of the resultant joint; and Fig. 12 shows the manner of splicing the ends of two conductors.

Referring to the drawings, the device in its preferred form comprises two levers 15 and 16, pivoted at 17, provided with similar handles 18 of suitable insulating material, and at their respective opposite ends shaped to form jaws 19 and 20. These jaws are similar in cross section, having back walls 21, rear side wall 22, coöperating when the handles are drawn together, and front walls 23 of less extent vertically than said rear walls for a purpose hereinafter described.

For supporting the improved tool when in use, a suitable stand is provided such as that shown in Fig. 1. This stand comprises generally speaking two forward uprights 25, and two rear upright members 26, bent forwardly at their upper portions and joined to said first-named uprights at 27, being also reversely bent downwardly at 28, to form a rest for the lower jaw of said tool. From the rear uprights extend upwardly two parallel members 29 connected at their top to form a rest for the upper of the handles 18, while said uprights are spaced apart, yet secured against separation by horizontally extending members 30.

For maintaining the jaws of the tool in closed position, a link 34 is provided and this link, pivoted at 35 to the lever 16, or an integral projection 36 thereof, surrounds both levers and at its upper end carries a suitable bolt or thumb screw, 37 adapted to enter the recess 38 in the upper lever 15. When the jaws are opened, said link lies idly as shown in Fig. 1.

The lower jaw extends laterally beyond the ends of the upper jaw to form brackets 40 recessed at 41 to provide for suitably securing therein one of the coöperating parts 42 of a wire clamp. Secured in any suitable manner to the top of said brackets are yokes 43, provided with clamping screws 44, while vertically slidable between the legs of said yokes are the upper members 45 of the wire clamps, said members being oppositely grooved to partially embrace the adjacent sides of said legs as at 46.

The under surfaces of the members 45 are broken by recesses 47 in alinement with, and similar in shape to, the recesses 48 in the upper surfaces of the lower clamp members. Said recesses may be of any size consistent with the various gages of electric conductor wires 49 and are generally used in pairs, *i. e.*, two lower members 42 and two upper members 45 of the same gage in the tool contemporaneously, but when, for instance, a No. 1 wire is to be welded to a No. 00 wire, the upper clamping members will be for one of the said numbers while the lower members are of the other number.

For supporting and securing together the two conductors when in the tool and intermediate the clamps, as well as for molding the melted solder or flux, suitable members 50 are provided in each of the tool jaws, said members being removably secured in place by means of bars, rods or keys 51 being inserted in the oppositely positioned grooves 52 and 53 in the said members and jaw sides, respectively, the same being suitably held in place as by the cotter pins 54 and enlarged heads 55. For any wide difference in conductors being handled, these members are generally replaced by others of a gage more nearly exact. As to material, they may be of hard steel, vitreous brick, porcelain, or any suitable material having a relatively high melting point and smooth surfaces. The adjacent faces 56 abut and are provided with registering circular grooves 57, adapted to contain the respective conductors 49, while rectangular offsets 58 provide a recess for the soldering ribbon or bar 59. The outer sides of these offsets open into the enlarged opening 60 formed between the surfaces 62 for the admission of the electrode 63.

As a flux, any suitable material is used, plain solder, several alloys, etc., preferably in ribbon or bar form, substantially rectangular with oppositely situated longitudinal grooves nearly uniting at the centers of their arcs. The molding members 42 and 45 are rounded off at 62, to permit access of the electrode 63, or oxy-acetylene nozzle, to the conductors and flux. If required the flux may be eliminated and the heat of the electric arc used to melt and unite integrally the metal of the conductors themselves. Of importance in such an operation is the fact that none of the metal of the conductors is lost, the same, although melted, being confined within the limits of the recesses 47 and 48, they in such case being simply U-shaped omitting the rectangular offset for containing the flux.

In Figs. 6 and 7 is shown a slightly different type of weld formed by a small, apertured block of solder 65 placed in the separable mold between the squarely cut ends of the conductors 66, which in this case do not overlap. The resultant joint 67 is rounded as seen in the latter figure. In Figs. 8 and 9 a joint is formed by placing an apertured block or pellet of flux material 68 between the obliquely cut ends of the conductors 69, the resultant joint 70 being similar to that shown in Fig. 9.

Figs. 10 and 11 illustrate the application of the new tool and method to the formation of a T joint. The upper clamp face is grooved as shown at 72 for the solder and at 73 for the conductor. The lower conductor is preferably depressed at 74 and the bar 75 of solder is placed therein, and the resultant joint between the main conductor 76 and the branch 77 is shown in the lower details of the group designated as Fig. 11.

This tool and method of joining electric conductors is particularly adapted to those of relatively large diameter, in which case it is very difficult to twist the conductors to hold while soldering, and to supply metallic connectors is relatively quite expensive. Furthermore, the joints formed in this manner are strong and durable and the actual effective contact surface between the conductors is larger than in the twisted forms of joint at least.

Fig. 12 illustrates a case in which a broken wire is to be spliced, the ends being too short to extend through the molds to the respective far clamps. In such case, each clamp holds but one wire and the filler previously placed between their ends is made to melt and flow as hereinbefore described.

Having described my invention, what I claim and desire to protect by Letters Patent of the United States is:—

1. A tool comprising separable jaws, a removable form secured to each of said jaws, and an adjustable clamp mounted upon one of said jaws and operative to secure an electric conductor in alinement with said forms.

2. A tool comprising pivotally separable jaws, a removable form secured in each of said jaws, and a clamp on each of the ends of the lower jaw for securing electric conductors in alinement with said forms.

3. A tool comprising two manually operable, pivotally connected levers, terminating at one end in jaws, two members of relatively high melting point, means for removably securing said members in said jaws, one of said jaws being extended laterally at opposite ends and provided with adjustable clamps for securing electric conductors between said jaws.

4. A tool comprising two manually operable, pivotally connected levers, terminating at one end in jaws, two members of relatively high melting point, and means for removably securing said members in said jaws, one of said jaws being extended laterally at opposite ends and provided with adjustable clamps, removable gripping members in said clamps having parallel grooves for securing electric conductors in alinement with said jaws.

5. A tool comprising separable jaws, a removable face block in each of said jaws and provided with a groove for containing an electric conductor and soldering or welding flux, clamps secured upon one of said jaws and provided with removable face blocks provided with parallel grooves for containing electric conductors and maintaining the same in alinement with the grooves in said first-mentioned face blocks while said conductors are being joined.

6. A tool comprising separable jaws, a removable form secured in each of said jaws, an adjustable clamp mounted upon one of said jaws, and removable gripping members within said clamp.

7. A tool comprising separable jaws, a removable form secured in each of said jaws, an adjustable clamp mounted upon one of said jaws, and removable gripping members within said clamp, which are respectively fixed and movable with relation to said clamp.

8. A tool comprising separable jaws, a form removably secured in one of said jaws, a clamp mounted upon one of said jaws, and removable gripping members within said clamp which are respectively fixed and movable with relation to said clamp.

In witness whereof, I, have hereunto set my hand this 4 day May, A. D. 1915.

ARTHUR HOLLISTER FARGO.

Witnesses:
FRANK L. GARDNER,
E. K. DUSENBURY.

Copies of this patent may be obtained for five cents each, by addressing the "Commissioner of Patents, Washington, D. C."